United States Patent
Zhao

(10) Patent No.: US 12,267,722 B2
(45) Date of Patent: Apr. 1, 2025

(54) METHOD OF TRANSMITTING BUFFER STATUS REPORTING AND TERMINAL

(71) Applicant: DATANG MOBILE COMMUNICATIONS EQUIPMENT CO., LTD., Beijing (CN)

(72) Inventor: Yali Zhao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 395 days.

(21) Appl. No.: 17/616,781

(22) PCT Filed: Apr. 24, 2020

(86) PCT No.: PCT/CN2020/086734
§ 371 (c)(1),
(2) Date: Dec. 6, 2021

(87) PCT Pub. No.: WO2020/244334
PCT Pub. Date: Dec. 10, 2020

(65) Prior Publication Data
US 2022/0303826 A1    Sep. 22, 2022

(30) Foreign Application Priority Data
Jun. 6, 2019 (CN) .......................... 201910491158.6

(51) Int. Cl.
*H04W 28/02* (2009.01)
*H04W 72/23* (2023.01)
(Continued)

(52) U.S. Cl.
CPC ....... *H04W 28/0278* (2013.01); *H04W 72/23* (2023.01); *H04W 72/569* (2023.01); *H04W 92/10* (2013.01)

(58) Field of Classification Search
None
See application file for complete search history.

(56) References Cited

U.S. PATENT DOCUMENTS 11,924,674 B2 *   3/2024   Liu ................... H04W 28/0268
2016/0066328 A1 *  3/2016   Hu ........................ H04W 72/12
                                                          370/329
(Continued)

FOREIGN PATENT DOCUMENTS

CN   104823503 A    8/2015
CN   106105305 A   11/2016
(Continued)

OTHER PUBLICATIONS

Chinese Office Action dated Sep. 1, 2021 for CN 201910491158.36.
(Continued)

*Primary Examiner* — Brian S Roberts
(74) *Attorney, Agent, or Firm* — Harness, Dickey & Pierce, P.L.C.

(57) ABSTRACT

A method of transmitting a buffer status reporting and a terminal are provided. The method includes: when triggering a first Buffer Status Reporting (BSR) and a second BSR, determining a target BSR with a higher priority between the first BSR and the second BSR according to a target logic channel; sending the target BSR; where the target logical channel includes a logical channel related to the first BSR and/or the second BSR, the first BSR is a BSR of a first communication interface, and the second BSR is a BSR of a second communication interface.

18 Claims, 3 Drawing Sheets

(51) Int. Cl.
*H04W 72/566* (2023.01)
*H04W 92/10* (2009.01)

(56) References Cited

U.S. PATENT DOCUMENTS

| | | | |
|---|---|---|---|
| 2017/0006628 A1* | 1/2017 | Takahashi | .............. H04L 69/28 |
| 2017/0019812 A1 | 1/2017 | Lee et al. | |
| 2017/0245245 A1 | 8/2017 | Kim | |
| 2017/0332392 A1 | 11/2017 | Miao et al. | |
| 2018/0054755 A1 | 2/2018 | Lee et al. | |
| 2018/0270699 A1 | 9/2018 | Babaei et al. | |
| 2023/0422145 A1* | 12/2023 | Wang | .................... H04B 7/155 |

FOREIGN PATENT DOCUMENTS

| | | |
|---|---|---|
| CN | 110603843 A | 12/2019 |
| WO | WO-2016/119160 A1 | 8/2016 |
| WO | WO-2018/082571 A1 | 5/2018 |

OTHER PUBLICATIONS

Written Opinion and International Search Report for International Application No. PCT/CN2020/086734 mailed Jun. 24, 2020.
Huawei (Rapporteur), "Email discussion summary of [106#80][NR V2X]—BSR and SR", 3GPP TSG-RAN WG2 #107, R2-1909303, Aug. 26-30, 2019, Prague, Czechia.
Ericsson, "gNB-Scheduled Resource Allocation for Sidelink", 3GPP TSG-RAN WG22 #106, TDoc R2-1907354, May 13-17, 2019, Reno, USA.
Huawei, Hisilicon, "Discussion on SL BSR procedure for NR SL Mode 1", 3GPP TSG-RAN WG2 Meeting #106, R2-1907449, May 13-17, 2019, Reno, USA.
CATT, "Sidelink SR/BSR in Uu Interface," 3GPP, R2-1900219, pp. 1-5, Feb. 15, 2019.
Extended European Search Report issued Jun. 20, 2022 in European Application No. 20818560.3.

* cited by examiner

METHOD OF TRANSMITTING BUFFER STATUS REPORTING AND TERMINAL

CROSS-REFERENCE TO RELATED APPLICATIONS

The present application is the U.S. national phase of PCT Application PCT/CN2020/086734 filed on Apr. 24, 2020, which claims a priority of Chinese patent application No. 201910491158.6 filed on Jun. 6, 2019, which is incorporated herein by reference in its entirety.

TECHNICAL FIELD

The present disclosure relates to the field of communications application technologies, and in particular, to a method of transmitting a buffer status reporting and a terminal.

BACKGROUND

Currently, for a direct communication interface Buffer Status Reporting (BSR) medium access control element (MAC CE) and a Uu interface BSR MAC CE, the priority order is fixed, that is, the BSR MAC CE priority of the Uu interface is always higher than that of the direct communication interface. Under the condition that the resources allocated by the base station are insufficient, the terminal always sends the BSR MAC CE of the Uu interface preferentially, and therefore, the transmission delay of the direct communication interface service may be affected.

SUMMARY

The present disclosure provides a method of transmitting a buffer status reporting and a terminal, so as to solve the problem that a transmission delay of a direct communication interface service is affected when a BSR of a direct communication interface and a BSR of a Uu interface are fixed and the terminal always preferentially sends the BSR of the Uu interface.

In order to achieve the above object, the present disclosure provides a method of transmitting a buffer status reporting, including:
  when triggering a first Buffer Status Reporting (BSR) and a second BSR, determining a target BSR with a higher priority between the first BSR and the second BSR according to a target logic channel;
  sending the target BSR;
  where the target logical channel includes a logical channel related to the first BSR and/or the second BSR, the first BSR is a BSR of a first communication interface, and the second BSR is a BSR of a second communication interface.

Optionally, the target logical channel includes a first logical channel for triggering a reporting of the first BSR and a second logical channel for triggering a reporting of the second BSR, or includes a third logical channel set corresponding to a scheduling request (SR) for triggering an allocation of an uplink grant, where the uplink grant is allocated by a network device and configured to carry the first BSR and/or the second BSR.

Optionally, the determining the target BSR with the higher priority between the first BSR and the second BSR according to the target logic channel includes:
  determining the target BSR with the higher priority between the first BSR and the second BSR according to a priority of the first logical channel and a priority of the second logical channel.

Optionally, the determining the target BSR with the higher priority between the first BSR and the second BSR according to the priority of the first logical channel and the priority of the second logical channel includes:
  determining the first BSR as the target BSR when the priority of the first logical channel is higher than the priority of the second logical channel; or
  determining the second BSR as the target BSR when the priority of the first logical channel is lower than the priority of the second logical channel; or
  selecting randomly one of the first BSR and the second BSR as the target BSR when the priority of the first logical channel is the same as the priority of the second logical channel.

Optionally, prior to the determining the target BSR with the higher priority between the first BSR and the second BSR according to the priority of the first logical channel and the priority of the second logical channel, the method further includes:
  after a priority parameter of the first logical channel is mapped into a priority parameter of the second logical channel according to a mapping relation between the priority parameter of the first logical channel and the priority parameter of the second logical channel, comparing and determining the priority of the first logical channel and the priority of the second logical channel; or
  after a priority parameter of the second logical channel is mapped into a priority parameter of the first logical channel according to the priority parameter of the first logical channel and the priority parameter of the second logical channel, comparing and determining the priority of the first logical channel and the priority of the second logical channel; or
  determining the priority of the first logical channel and the priority of the second logical channel, according to a relation between a value corresponding to a priority parameter of the first logical channel and a first preset threshold; or
  determining the priority of the first logical channel and the priority of the second logical channel, according to a relation between a value corresponding to a priority parameter of the second logical channel and a second preset threshold; or
  determining the priority of the first logical channel and the priority of the second logical channel according to a priority parameter of the first logical channel and a priority parameter of the second logical channel.

Optionally, the determining the priority of the first logical channel and the priority of the second logical channel according to the relation between the value corresponding to the priority parameter of the first logical channel and the first preset threshold includes:
  when the value corresponding to the priority parameter of the first logical channel is smaller than the first preset threshold, determining that the priority of the first logic channel is higher than the priority of the second logic channel.

Optionally, the determining the priority of the first logical channel and the priority of the second logical channel according to the relation between the value corresponding to the priority parameter of the second logical channel and the second preset threshold includes:
  when the value corresponding to the priority parameter of the second logical channel is smaller than the second preset threshold, determining that the priority of the second logic channel is higher than the priority of the first logic channel.

Optionally, the determining the target BSR with higher priority between the first BSR and the second BSR according to the target logical channel includes:

determining the first BSR as the target BSR when only the logical channel of the first communication interface is included in the third logical channel set; or determining the second BSR as the target BSR when only the logical channel of the second communication interface is included in the third logical channel set; or when the third logical channel set includes the logical channel of the first communication interface and the logical channel of the second communication interface, determining, according to a priority of a fourth logical channel and a priority of a fifth logical channel, the target BSR with the higher priority between the first BSR and the second BSR;

where the fourth logical channel is a logical channel with a highest priority among logical channels corresponding to the first communication interface in the third logical channel set, and the fifth logical channel is a logical channel with a highest priority among logical channels corresponding to the second communication interface in the third logical channel set.

Optionally, the determining the target BSR with higher priority between the first BSR and the second BSR according to the priority of the fourth logical channel and the priority of the fifth logical channel includes:

determining the first BSR as the target BSR when the priority of the fourth logical channel is higher than the priority of the fifth logical channel; or determining the second BSR as the target BSR when the priority of the fifth logical channel is higher than the priority of the fourth logical channel; or selecting randomly one of the first BSR and the second BSR as the target BSR when the priority of the fourth logical channel is the same as the priority of the fifth logical channel.

Optionally, prior to the determining the target BSR with higher priority between the first BSR and the second BSR according to the priority of the fourth logical channel and the priority of the fifth logical channel, the method further includes:

after a priority parameter of the fourth logical channel is mapped into a priority parameter of the fifth logical channel according to a mapping relation between the priority parameter of the fourth logical channel and the priority parameter of the fifth logical channel, comparing and determining the priority of the fourth logical channel and the priority of the fifth logical channel; or after a priority parameter of the fifth logical channel is mapped into a priority parameter of the fourth logical channel according to a mapping relation between the priority parameter of the fourth logical channel and the priority parameter of the fifth logical channel, comparing and determining the priority of the fourth logical channel and the priority of the fifth logical channel; or determining the priority of the fourth logical channel and the priority of the fifth logical channel according to a relationship between a value corresponding to a priority parameter of the fourth logical channel and a third preset threshold; or determining the priority of the fourth logical channel and the priority of the fifth logical channel according to a relationship between a value corresponding to a priority parameter of the fifth logical channel and a fourth preset threshold; or determining the priority of the fourth logical channel and the priority of the fifth logical channel according to a priority parameter of the fourth logical channel and a priority parameter of the fifth logical channel.

Optionally, subsequent to the determining the target BSR with the higher priority between the first BSR and the second BSR according to the target logic channel, the method further includes:

when an uplink grant allocated by a network equipment is able to carry a BSR of only one communication interface, if the target BSR is the second BSR, canceling all suspended SRs and stopping SR prohibition timers corresponding to the SRs; or when an uplink grant is able to carry a BSR of only one communication interface, if the target BSR is the first BSR, cancelling only a SR triggered by the first communication interface, and stopping a SR prohibition timer corresponding to the SR triggered by the first communication interface.

Optionally, the first communication interface is a communication interface between terminals, and the second communication interface is a communication interface between a terminal and a network device.

A terminal is further provided in the present disclosure, including: a transceiver, a memory, a processor, and a program stored in the memory and executable on the processor, where the processor is configured to execute the program to perform:

when triggering a first Buffer Status Reporting (BSR) and a second BSR, determining a target BSR with a higher priority between the first BSR and the second BSR according to a target logic channel;

sending the target BSR;

where the target logical channel includes a logical channel related to the first BSR and/or the second BSR, the first BSR is a BSR of a first communication interface, and the second BSR is a BSR of a second communication interface.

Optionally, the target logical channel includes a first logical channel for triggering a reporting of the first BSR and a second logical channel for triggering a reporting of the second BSR, or includes a third logical channel set corresponding to a scheduling request (SR) for triggering an allocation of an uplink grant, where the uplink grant is allocated by a network device and configured to carry the first BSR and/or the second BSR.

Optionally, the determining the target BSR with the higher priority between the first BSR and the second BSR according to the target logic channel includes:

determining the target BSR with the higher priority between the first BSR and the second BSR according to a priority of the first logical channel and a priority of the second logical channel.

Optionally, the determining the target BSR with the higher priority between the first BSR and the second BSR according to the priority of the first logical channel and the priority of the second logical channel includes:

determining the first BSR as the target BSR when the priority of the first logical channel is higher than the priority of the second logical channel; or determining the second BSR as the target BSR when the priority of the first logical channel is lower than the priority of the second logical channel; or selecting randomly one of the first BSR and the second BSR as the target BSR when the priority of the first logical channel is the same as the priority of the second logical channel.

Optionally, prior to the determining the target BSR with the higher priority between the first BSR and the second BSR according to the priority of the first logical channel and the priority of the second logical channel, the processor is configured to execute the program to perform:

after a priority parameter of the first logical channel is mapped into a priority parameter of the second logical channel according to a mapping relation between the priority parameter of the first logical channel and the priority parameter of the second logical channel, comparing and determining the priority of the first logical channel and the priority of the second logical channel; or after a priority parameter of the second logical channel is mapped into a priority parameter of the first logical channel according to the priority parameter of the first logical channel and the priority parameter of the second logical channel, comparing and determining the priority of the first logical channel and the priority of the second logical channel; or determining the priority of the first logical channel and the priority of the second logical channel, according to a relation between a value corresponding to a priority parameter of the first logical channel and a first preset threshold; or determining the priority of the first logical channel and the priority of the second logical channel, according to a relation between a value corresponding to a priority parameter of the second logical channel and a second preset threshold; or determining the priority of the first logical channel and the priority of the second logical channel according to a priority parameter of the first logical channel and a priority parameter of the second logical channel.

Optionally, the determining the priority of the first logical channel and the priority of the second logical channel according to the relation between the value corresponding to the priority parameter of the first logical channel and the first preset threshold includes:

when the value corresponding to the priority parameter of the first logical channel is smaller than the first preset threshold, determining that the priority of the first logic channel is higher than the priority of the second logic channel.

Optionally, the determining the priority of the first logical channel and the priority of the second logical channel according to the relation between the value corresponding to the priority parameter of the second logical channel and the second preset threshold includes:

when the value corresponding to the priority parameter of the second logical channel is smaller than the second preset threshold, determining that the priority of the second logic channel is higher than the priority of the first logic channel.

Optionally, the determining the target BSR with higher priority between the first BSR and the second BSR according to the target logical channel includes:

determining the first BSR as the target BSR when only the logical channel of the first communication interface is included in the third logical channel set; or determining the second BSR as the target BSR when only the logical channel of the second communication interface is included in the third logical channel set; or when the third logical channel set includes the logical channel of the first communication interface and the logical channel of the second communication interface, determining, according to a priority of a fourth logical channel and a priority of a fifth logical channel, the target BSR with the higher priority between the first BSR and the second BSR;

where the fourth logical channel is a logical channel with a highest priority among logical channels corresponding to the first communication interface in the third logical channel set, and the fifth logical channel is a logical channel with a highest priority among logical channels corresponding to the second communication interface in the third logical channel set.

Optionally, the determining the target BSR with higher priority between the first BSR and the second BSR according to the priority of the fourth logical channel and the priority of the fifth logical channel includes:

determining the first BSR as the target BSR when the priority of the fourth logical channel is higher than the priority of the fifth logical channel; or determining the second BSR as the target BSR when the priority of the fifth logical channel is higher than the priority of the fourth logical channel; or selecting randomly one of the first BSR and the second BSR as the target BSR when the priority of the fourth logical channel is the same as the priority of the fifth logical channel.

Optionally, prior to the determining the target BSR with higher priority between the first BSR and the second BSR according to the priority of the fourth logical channel and the priority of the fifth logical channel, he processor is configured to execute the program to perform:

after a priority parameter of the fourth logical channel is mapped into a priority parameter of the fifth logical channel according to a mapping relation between the priority parameter of the fourth logical channel and the priority parameter of the fifth logical channel, comparing and determining the priority of the fourth logical channel and the priority of the fifth logical channel; or after a priority parameter of the fifth logical channel is mapped into a priority parameter of the fourth logical channel according to a mapping relation between the priority parameter of the fourth logical channel and the priority parameter of the fifth logical channel, comparing and determining the priority of the fourth logical channel and the priority of the fifth logical channel; or determining the priority of the fourth logical channel and the priority of the fifth logical channel according to a relationship between a value corresponding to a priority parameter of the fourth logical channel and a third preset threshold; or determining the priority of the fourth logical channel and the priority of the fifth logical channel according to a relationship between a value corresponding to a priority parameter of the fifth logical channel and a fourth preset threshold; or determining the priority of the fourth logical channel and the priority of the fifth logical channel according to a priority parameter of the fourth logical channel and a priority parameter of the fifth logical channel.

Optionally, subsequent to the determining the target BSR with the higher priority between the first BSR and the second BSR according to the target logic channel, the processor is configured to execute the program to perform:

when an uplink grant allocated by a network equipment is able to carry a BSR of only one communication interface, if the target BSR is the second BSR, canceling all suspended SRs and stopping SR prohibition timers corresponding to the SRs; or when an uplink grant is able to carry a BSR of only one communication interface, if the target BSR is the first BSR, cancelling only a SR triggered by the first communication interface, and stopping a SR prohibition timer corresponding to the SR triggered by the first communication interface.

Optionally, the first communication interface is a communication interface between terminals, and the second communication interface is a communication interface between a terminal and a network device.

A computer-readable storage medium is further provided in the present disclosure, storing a computer program, where the computer program is executed by a processor to perform the method of transmitting a buffer status reporting hereinabove.

A terminal is further provided in the present disclosure, including:
- a first determining module, configured to when triggering a first Buffer Status Reporting (BSR) and a second BSR, determine a target BSR with a higher priority between the first BSR and the second BSR according to a target logic channel;
- a sending module, configured to send the target BSR;
- where the target logical channel includes a logical channel related to the first BSR and/or the second BSR, the first BSR is a BSR of a first communication interface, and the second BSR is a BSR of a second communication interface.

Optionally, the target logical channel includes a first logical channel for triggering a reporting of the first BSR and a second logical channel for triggering a reporting of the second BSR, or includes a third logical channel set corresponding to a scheduling request (SR) for triggering an allocation of an uplink grant, where the uplink grant is allocated by a network device and configured to carry the first BSR and/or the second BSR.

Optionally, the first determining module is configured to determine the target BSR with the higher priority between the first BSR and the second BSR according to a priority of the first logical channel and a priority of the second logical channel.

Optionally, the first determining module is configured to:
- determine the first BSR as the target BSR when the priority of the first logical channel is higher than the priority of the second logical channel; or
- determine the second BSR as the target BSR when the priority of the first logical channel is lower than the priority of the second logical channel; or
- select randomly one of the first BSR and the second BSR as the target BSR when the priority of the first logical channel is the same as the priority of the second logical channel.

Optionally, the terminal further includes a second determining module configured to, prior to the determining the target BSR with the higher priority between the first BSR and the second BSR according to the priority of the first logical channel and the priority of the second logical channel,
- after a priority parameter of the first logical channel is mapped into a priority parameter of the second logical channel according to a mapping relation between the priority parameter of the first logical channel and the priority parameter of the second logical channel, compare and determine the priority of the first logical channel and the priority of the second logical channel; or
- after a priority parameter of the second logical channel is mapped into a priority parameter of the first logical channel according to the priority parameter of the first logical channel and the priority parameter of the second logical channel, compare and determine the priority of the first logical channel and the priority of the second logical channel; or
- determine the priority of the first logical channel and the priority of the second logical channel, according to a relation between a value corresponding to a priority parameter of the first logical channel and a first preset threshold; or
- determine the priority of the first logical channel and the priority of the second logical channel, according to a relation between a value corresponding to a priority parameter of the second logical channel and a second preset threshold; or
- determine the priority of the first logical channel and the priority of the second logical channel according to a priority parameter of the first logical channel and a priority parameter of the second logical channel.

Optionally, the second determining module is configured to:
- when the value corresponding to the priority parameter of the first logical channel is smaller than the first preset threshold, determine that the priority of the first logic channel is higher than the priority of the second logic channel.

Optionally, the second determining module is configured to:
- when the value corresponding to the priority parameter of the second logical channel is smaller than the second preset threshold, determine that the priority of the second logic channel is higher than the priority of the first logic channel.

Optionally, the first determining module is configured to:
- determine the first BSR as the target BSR when only the logical channel of the first communication interface is included in the third logical channel set; or
- determine the second BSR as the target BSR when only the logical channel of the second communication interface is included in the third logical channel set; or
- when the third logical channel set includes the logical channel of the first communication interface and the logical channel of the second communication interface, determine, according to a priority of a fourth logical channel and a priority of a fifth logical channel, the target BSR with the higher priority between the first BSR and the second BSR;
- where the fourth logical channel is a logical channel with a highest priority among logical channels corresponding to the first communication interface in the third logical channel set, and the fifth logical channel is a logical channel with a highest priority among logical channels corresponding to the second communication interface in the third logical channel set.

Optionally, the first determining module is configured to:
- determine the first BSR as the target BSR when the priority of the fourth logical channel is higher than the priority of the fifth logical channel; or
- determine the second BSR as the target BSR when the priority of the fifth logical channel is higher than the priority of the fourth logical channel; or select randomly one of the first BSR and the second BSR as the target BSR when the priority of the fourth logical channel is the same as the priority of the fifth logical channel.

Optionally, the terminal further includes a third determining module configured to:

after a priority parameter of the fourth logical channel is mapped into a priority parameter of the fifth logical channel according to a mapping relation between the priority parameter of the fourth logical channel and the priority parameter of the fifth logical channel, compare and determine the priority of the fourth logical channel and the priority of the fifth logical channel; or after a priority parameter of the fifth logical channel is mapped into a priority parameter of the fourth logical channel according to a mapping relation between the priority parameter of the fourth logical channel and the priority parameter of the fifth logical channel, compare and determine the priority of the fourth logical channel and the priority of the fifth logical channel; or determine the priority of the fourth logical channel and the priority of the fifth logical channel according to a relationship between a value corresponding to a priority parameter of the fourth logical channel and a third preset threshold; or determine the priority of the fourth logical channel and the priority of the fifth logical channel according to a relationship between a value corresponding to a priority parameter of the fifth logical channel and a fourth preset threshold; or determine the priority of the fourth logical channel and the priority of the fifth logical channel according to a priority parameter of the fourth logical channel and a priority parameter of the fifth logical channel.

Optionally, the terminal further includes a processing module configured to:

when an uplink grant allocated by a network equipment is able to carry a BSR of only one communication interface, if the target BSR is the second BSR, cancel all suspended SRs and stop SR prohibition timers corresponding to the SRs; or when an uplink grant is able to carry a BSR of only one communication interface, if the target BSR is the first BSR, cancel only a SR triggered by the first communication interface, and stop a SR prohibition timer corresponding to the SR triggered by the first communication interface.

Optionally, the first communication interface is a communication interface between terminals, and the second communication interface is a communication interface between a terminal and a network device.

The embodiment of the disclosure has the following beneficial effects:

according to the embodiment of the present disclosure, when the reporting of the first buffer status reporting BSR and the second BSR are triggered, the target BSR with higher priority is determined from the first BSR and the second BSR according to the target logical channel, and the target BSR is sent. In the embodiment of the present disclosure, the target BSR with a higher priority between the first BSR and the second BSR is dynamically determined according to the target logical channel, and the target BSR with a higher priority is sent instead of always preferentially sending the BSR with the Uu interface according to a fixed priority order, so that the service quality of a corresponding communication interface service can be effectively ensured, for example, the transmission delay of the direct communication interface service is effectively ensured.

DETAILED DESCRIPTION

Figure 1:
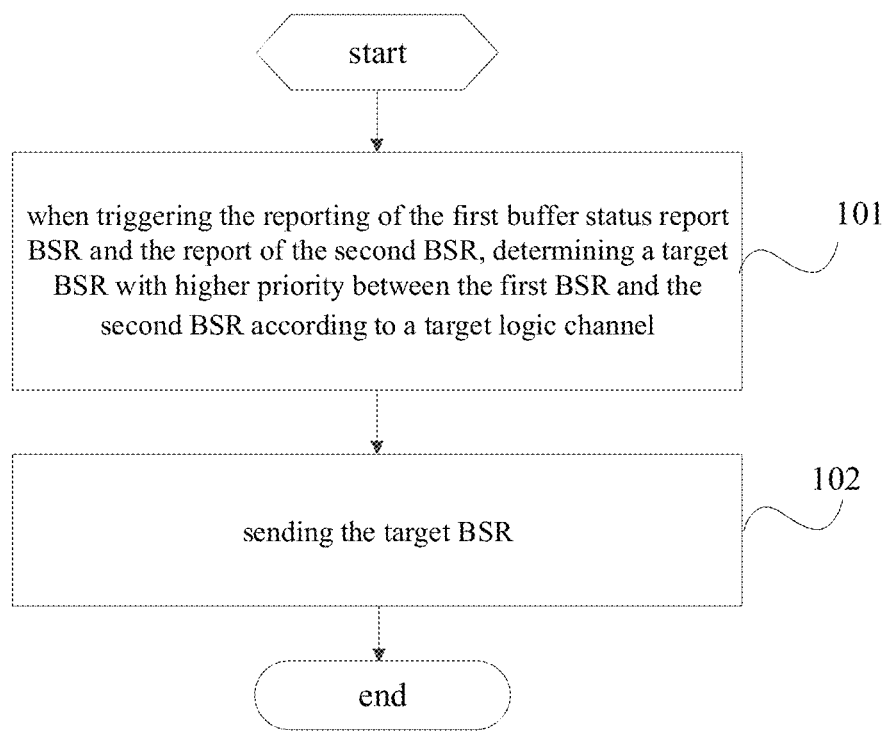
FIG. 1 is a flowchart illustrating a transmission method of a buffer status reporting according to an embodiment of the disclosure.

Exemplary embodiments of the present disclosure will be described in more detail below with reference to the accompanying drawings. While exemplary embodiments of the present disclosure are shown in the drawings, it should be understood that the present disclosure may be embodied in various forms and should not be limited by the embodiments set forth herein. Rather, these embodiments are provided so that this disclosure will be thorough and complete, and will fully convey the scope of the disclosure to those skilled in the art.

The terms first, second and the like in the description and in the claims of the present application are used for distinguishing between similar elements and not necessarily for describing a particular sequential or chronological order. It is to be understood that the data so used may be interchanged under appropriate circumstances such that the embodiments of the application described herein may be implemented, for example, in sequences other than those illustrated or described herein. Moreover, the terms "comprises," "comprising," and "having," and any variations thereof, are intended to cover a non-exclusive inclusion, such that a process, method, system, article, or apparatus that comprises a list of steps or elements is not necessarily limited to those steps or elements expressly listed, but may include other steps or elements not expressly listed or inherent to such process, method, article, or apparatus. In the description and in the claims "and/or" means at least one of the connected objects. Specifically, "a and/or B" as used in the specification and claims means "a alone, B, A and B alone are present", and the like.

The following description provides examples, and does not limit the scope, applicability, or configuration set forth in the claims. Changes may be made in the function and arrangement of elements discussed without departing from the spirit and scope of the disclosure. Various examples may omit, substitute, or add various procedures or components as appropriate. For example, the methods described may be performed in an order different than described, and various steps may be added, omitted, or combined. Additionally, features described with reference to certain examples may be combined in other examples.

In order to enable those skilled in the art to better understand the transmission method of the buffer status reporting according to the embodiment of the present disclosure, the following description is made first.

(1) Cellular Network Communications.

The traditional wireless communication adopts a cellular network communication mode, namely, a terminal and network side equipment transmit uplink data or control information through a Uu interface.

(2) Direct Communication.

Direct communication refers to a manner in which a nearby terminal can perform data transmission through a direct communication link (also referred to as Sidelink) in a close range. The wireless interface to which the Sidelink link corresponds is referred to as a direct communication interface, also referred to as a Sidelink interface.

(3) LCP Mechanism of Long Term Evolution LTE System.

Logical Channel Priority (LCP), that is, a process in which the terminal organizes an uplink data packet according to an uplink grant (UL grant) allocated by the network side.

In the process of organizing the uplink data packets, the priority order between the MAC CE and the data from the logical channels is fixed, as follows:
- a cell radio network temporary identifier (MAC control element for C-RNTI or data from UL-CCCH) of a media access control unit or an uplink common control channel;
- reporting a media access control unit (MAC control element for DPR) by data capacity and power headroom;
- a semi-persistent scheduling acknowledgement medium access control element (MAC control element for SPS control);
- an automatic uplink acknowledgement medium access control unit (MAC control element for AUL configuration);
- reporting a buffer state to a media access control unit (MAC control element for BSR) except for filling the BSR (with an exception of the buffer state having been included for padding);
- reporting the power headroom or the Extended power headroom or the Dual Connectivity power headroom to a medium access control unit (MAC control element for PHR, Extended PHR, or Dual Connectivity PHR);
- a direct communication interface media access control unit, except for filling the Sidelink BSR (MAC control element for Sidelink BSR, with exception of the Sidelink BSR included for padding);
- other Logical Channel data (except for the uplink common control Channel data) than the uplink common control Channel data;
- a Recommended bit query MAC CE (MAC control element for Recommended bit rate query);
- padding BSR MAC CE (MAC control element for BSR included for padding);
- padding the Sidelink BSR MAC CE (MAC control element for Sidelink BSR included for padding).

For data from logical channels, the specific LCP procedure is as follows:

1. and performing the first round of resource allocation according to the descending order of priority parameters of all the logic channels with tokens. The first round of resource allocation is performed based on the Prioritized Bit Rate (PBR) of each logical channel, and the number of available tokens for each logical channel is updated according to the resource allocation.

2. If there are more resources left, then a second round of resource allocation is performed. The second round of resource allocation is to allocate resources to the data except the PBR according to the descending order of priority parameters of all the logical channels with data transmission. Resource allocation until all data of the logical channel with tokens is allocated or exhausted.

However, the BSR of the direct communication interface and the BSR of the Uu interface are fixed in priority, and the terminal always preferentially sends the BSR of the Uu interface, which may affect the transmission delay of the direct communication interface service.

Based on this, the embodiment of the present disclosure provides a transmission method of a buffer status reporting, which is applied to a terminal, and as shown in FIG. 1, the transmission method includes steps 101 and 102.

Step 101: when triggering the reporting of the first buffer status reporting BSR and the report of the second BSR, determining a target BSR with higher priority between the first BSR and the second BSR according to a target logic channel.

The target logical channel includes a logical channel related to the first BSR and/or the second BSR, the first BSR is a BSR of a first communication interface, and the second BSR is a BSR of a second communication interface.

The first communication interface is a communication interface between the terminal and the terminal, for example, a direct communication interface, and the second communication interface is a communication interface between the terminal and the network device, for example, a Uu interface.

Step 102: sending the target BSR.

In the method of transmitting a buffer status reporting according to the embodiment of the present disclosure, when a reporting of a first buffer status reporting BSR and a second BSR are triggered, a target BSR with a higher priority is determined from the first BSR and the second BSR according to a target logical channel, and the target BSR is sent. In the embodiment of the present disclosure, a target BSR with a higher priority between the first BSR and the second BSR is dynamically determined according to a target logical channel, and the target BSR with the higher priority is sent instead of always preferentially sending the BSR with the Uu interface according to a fixed priority order, so that the service quality of a corresponding communication interface service, for example, the service quality of a direct communication interface service, can be effectively ensured.

Further, the target logical channel includes a first logical channel for triggering a reporting of the first BSR and a second logical channel for triggering a reporting of the second BSR, or includes a third logical channel set corresponding to a scheduling request (SR) for triggering an allocation of an uplink grant, where the uplink grant is allocated by a network device and configured to carry the first BSR and/or the second BSR.

The third set of logical channels includes at least one logical channel.

As a first optional implementation manner, the determining, according to a target logical channel, a target BSR with a higher priority from a first BSR and a second BSR includes:
  determining a target BSR with higher priority between the first BSR and the second BSR according to the priority of the first logical channel and the priority of the second logical channel.

Specifically, when the priority of the first logical channel is higher than the priority of the second logical channel, the first BSR is determined to be the target BSR;
  or, when the priority of the first logical channel is lower than the priority of the second logical channel, determining that the second BSR is the target BSR;
  or, when the priority of the first logical channel is the same as the priority of the second logical channel, randomly selecting one BSR among the first BSR and the second BSR as the target BSR.

For example, random numbers between 0 and 1 are generated, if the random numbers are smaller than 0.5, the first BSR is the target BSR, and otherwise, the second BSR is taken as the target BSR.

Further, before determining the target BSR with higher priority from the first BSR and the second BSR according to the priority of the first logical channel and the priority of the second logical channel, the method further includes:

after a priority parameter of the first logical channel is mapped into a priority parameter of the second logical channel according to a mapping relation between the priority parameter of the first logical channel and the priority parameter of the second logical channel, comparing and determining the priority of the first logical channel and the priority of the second logical channel; or after a priority parameter of the second logical channel is mapped into a priority parameter of the first logical channel according to the priority parameter of the first logical channel and the priority parameter of the second logical channel, comparing and determining the priority of the first logical channel and the priority of the second logical channel.

Here, in a case where there is no direct comparability between the priority parameter of the first logical channel and the priority parameter of the second logical channel, for example, the value ranges are completely different, it is necessary to define a mapping relationship between the priority parameter of the first logical channel and the priority parameter of the second logical channel. In the case that the first communication interface is a direct communication interface and the second communication interface is a Uu interface, taking a New Radio (NR) system of the fifth Generation (5-th Generation, 5G) as an example, if the priority levels of the current direct communication interfaces are 8 and the priority levels of the Uu interfaces are 16, the following mapping relationship may be defined, as shown in table 1, and the priorities between the two interfaces may be directly compared according to the following mapping relationship.

TABLE 1

| Priority parameter in RLC bearing configuration information corresponding to Uu interface signaling radio bearing SRB/data radio bearing DRB | Priority parameter in RLC bearing configuration information corresponding to corresponding direct communication interface SRB/DRB |
|---|---|
| 0-1 | 0 |
| 2-3 | 1 |
| 4-5 | 2 |
| 6-7 | 3 |
| 8-9 | 4 |
| 10-11 | 5 |
| 12-13 | 6 |
| 14-15 | 7 |

For example, if the priority parameter in the RLC bearer configuration information corresponding to the SRB or the DRB corresponding to the Uu interface is 4, and the priority parameter in the RLC bearer configuration information corresponding to the SRB or the DRB corresponding to the direct communication interface is 1, it is determined that the priority of the Uu interface logical channel is lower than the priority of the direct communication interface logical channel. For another example, if the priority parameter in the RLC bearer configuration information corresponding to the SRB or DRB corresponding to the Uu interface is 4, and the priority parameter in the RLC bearer configuration information corresponding to the SRB or DRB corresponding to the direct communication interface is 2, it is determined that the priority of the Uu interface logical channel is the same as the priority of the direct communication interface logical channel.

Alternatively, determining the priority of the first logical channel and the priority of the second logical channel, according to a relation between a value corresponding to a priority parameter of the first logical channel and a first preset threshold.

Specifically, when the value corresponding to the priority parameter of the first logical channel is smaller than a first preset threshold, it is determined that the priority of the first logical channel is higher than the priority of the second logical channel.

Here, a value corresponding to the priority parameter threshold of the first communication interface is predefined as a first preset threshold, for example, 3, and if the value corresponding to the priority parameter of the first logical channel is 1, it is determined that the priority of the first logical channel is higher than the priority of the second logical channel.

Alternatively, determining the priority of the first logical channel and the priority of the second logical channel, according to a relation between a value corresponding to a priority parameter of the second logical channel and a second preset threshold.

Specifically, when the value corresponding to the priority parameter of the second logical channel is smaller than a second preset threshold, it is determined that the priority of the second logical channel is higher than the priority of the first logical channel.

Here, a value corresponding to the priority parameter threshold of the second communication interface is predefined to be a second preset threshold, for example, 4, and if the value corresponding to the priority parameter of the second logical channel is 2, it is determined that the priority of the second logical channel is higher than the priority of the first logical channel.

Alternatively, determining the priority of the first logical channel and the priority of the second logical channel according to a priority parameter of the first logical channel and a priority parameter of the second logical channel.

In the case of comparability between the priority parameter of the first logical channel and the priority parameter of the second logical channel, the priority parameter of the first logical channel and the priority parameter of the second logical channel are directly compared to determine the priorities of the first logical channel and the second logical channel.

In the first optional implementation manner, the priority of the first logical channel reported by the first BSR and the priority of the second logical channel reported by the second BSR are triggered, and a target BSR with a higher priority is dynamically determined from the first BSR and the second BSR, so that the target BSR is preferentially sent to ensure the transmission delay of the service.

As a second optional implementation manner, the determining, according to a target logical channel, a target BSR with a higher priority from a first BSR and a second BSR includes:

determining the first BSR as the target BSR when only the logical channel of the first communication interface is included in the third logical channel set; or determining the second BSR as the target BSR when only the logical channel of the second communication interface is included in the third logical channel set; or when the third logical channel set includes the logical channel of the first communication interface and the logical channel of the second communication interface, determining, according to a priority of a fourth logical channel and a priority of a fifth logical channel, the target BSR with the higher priority between the first BSR and the second BSR;

where the fourth logical channel is a logical channel with a highest priority among logical channels corresponding to the first communication interface in the third logical channel set, and the fifth logical channel is a logical channel with a highest priority among logical channels corresponding to the second communication interface in the third logical channel set.

Specifically, the determining, according to the priority of the fourth logical channel and the priority of the fifth logical channel, the target BSR with a higher priority from the first BSR and the second BSR includes:

determining the first BSR as the target BSR when the priority of the fourth logical channel is higher than the priority of the fifth logical channel; or determining the second BSR as the target BSR when the priority of the fifth logical channel is higher than the priority of the fourth logical channel; or selecting randomly one of the first BSR and the second BSR as the target BSR when the priority of the fourth logical channel is the same as the priority of the fifth logical channel.

Further, before determining the target BSR with higher priority from the first BSR and the second BSR according to the priority of the fourth logical channel and the priority of the fifth logical channel, the method further includes:

after a priority parameter of the fourth logical channel is mapped into a priority parameter of the fifth logical channel according to a mapping relation between the priority parameter of the fourth logical channel and the priority parameter of the fifth logical channel, comparing and determining the priority of the fourth logical channel and the priority of the fifth logical channel; or after a priority parameter of the fifth logical channel is mapped into a priority parameter of the fourth logical channel according to a mapping relation between the priority parameter of the fourth logical channel and the priority parameter of the fifth logical channel, comparing and determining the priority of the fourth logical channel and the priority of the fifth logical channel.

Here, after mapping the priority parameter of the fourth logical channel into the priority parameter of the fifth logical channel, comparing and determining that the implementation of the priorities of the fourth logical channel and the fifth logical channel is the same as that after mapping the priority parameter of the first logical channel into the priority parameter of the second logical channel, comparing and determining that the priorities of the first logical channel and the second logical channel are the same, and after mapping the priority parameter of the fifth logical channel into the priority parameter of the fourth logical channel, comparing and determining that the implementation of the priorities of the fourth logical channel and the fifth logical channel is the same as that after mapping the priority parameter of the second logical channel into the priority parameter of the first logical channel, comparing and determining that the priorities of the first logical channel and the second logical channel are the same, and will not be described in detail herein.

Alternatively, determining the priority of the fourth logical channel and the priority of the fifth logical channel according to a relationship between a value corresponding to a priority parameter of the fourth logical channel and a third preset threshold.

Specifically, when the value corresponding to the priority parameter of the fourth logical channel is smaller than a fourth preset threshold, it is determined that the priority of the fourth logical channel is higher than the priority of the fifth logical channel.

Alternatively, determining the priority of the fourth logical channel and the priority of the fifth logical channel according to a relationship between a value corresponding to a priority parameter of the fifth logical channel and a fourth preset threshold.

Specifically, when the value corresponding to the priority parameter of the fifth logical channel is smaller than a fourth preset threshold, it is determined that the priority of the fifth logical channel is higher than the priority of the fourth logical channel.

Alternatively, determining the priority of the fourth logical channel and the priority of the fifth logical channel according to a priority parameter of the fourth logical channel and a priority parameter of the fifth logical channel.

In the case of comparability between the priority parameter of the fourth logical channel and the priority parameter of the fifth logical channel, the priority parameter of the fourth logical channel and the priority parameter of the fifth logical channel are directly compared to determine the priority of the fourth logical channel and the priority of the fifth logical channel.

In the second optional implementation manner, the third logical channel set corresponding to the scheduling request (SR) allocated by the uplink grant is triggered, and the target BSR with higher priority between the first BSR and the second BSR is dynamically determined, so that the target BSR is preferentially sent to ensure the transmission delay of the service.

Further, the method of transmitting a buffer status reporting according to the embodiment of the present disclosure, after determining, according to a target logical channel, a target BSR with a higher priority from a first BSR and a second BSR, further includes:

when an uplink grant allocated by a network equipment is able to carry a BSR of only one communication interface, if the target BSR is the second BSR, canceling all suspended SRs and stopping SR prohibition timers corresponding to the SRs; or when an uplink grant is able to carry a BSR of only one communication interface, if the target BSR is the first BSR, cancelling only a SR triggered by the first communication interface, and stopping a SR prohibition timer corresponding to the SR triggered by the first communication interface.

In a specific embodiment of the present disclosure, if the target BSR is of a Uu interface, canceling all SR pending, and stopping an SR prohibition timer corresponding to the SR; and if the target BSR is the BSR of the direct communication interface, only canceling the SR triggered by the direct communication interface and stopping the SR prohibition timer corresponding to the SR triggered by the direct communication interface.

The following describes a method of transmitting a buffer status reporting according to the present disclosure with reference to a specific embodiment.

Figure 2:
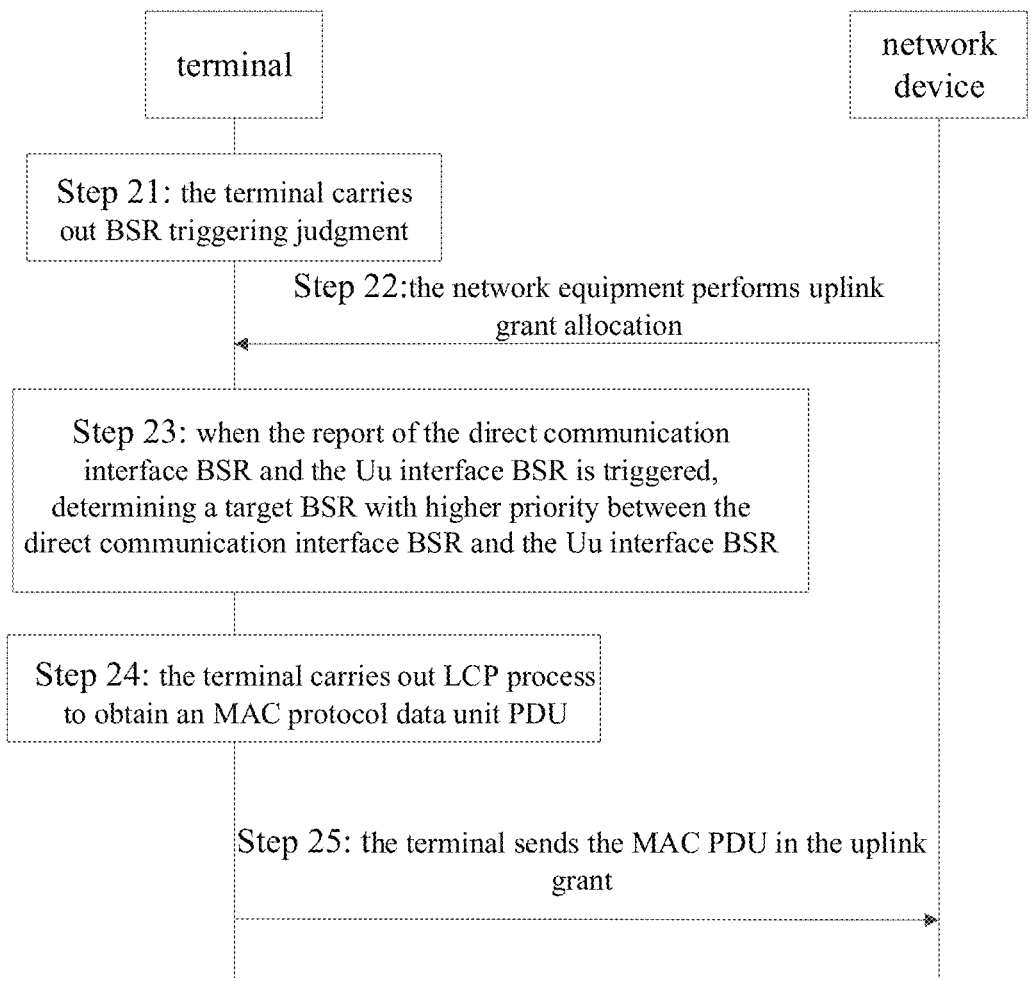
FIG. 2 is a schematic diagram of an interaction between a terminal and a network device according to an embodiment of the disclosure.

The first embodiment is as follows:

as shown in FIG. 2, the transmission method according to the embodiment of the present disclosure includes: steps 21 to 25.

Step 21: the terminal carries out BSR triggering judgment.

Here, the BSR trigger condition judgment for the direct communication interface and the Uu interface complies with the existing protocol.

Step 22: the network equipment performs uplink grant allocation.

The allocation of the uplink grant may be based on SR allocation, or may be based on BSR allocation reported by the terminal before.

Step 23: when the report of the direct communication interface BSR and the Uu interface BSR is triggered, determining a target BSR with higher priority between the direct communication interface BSR and the Uu interface BSR.

Specifically, the target BSR may be determined according to the first optional implementation manner or the second optional implementation manner.

Step 24: the terminal carries out LCP process to obtain an MAC protocol data unit PDU.

After determining the target BSR with higher priority from the direct communication interface BSR and the Uu interface BSR, the terminal may organize the MAC PDUs according to the priority order of the direct communication interface BSR and the Uu interface BSR.

If the uplink grant (UL grant) can only carry BSR MAC CE of one interface, the terminal behavior may be as follows:

and if the UL grant carries the BSR MAC CE of the Uu interface according to the priority sequence of the BSR MAC CEs, canceling all pending SRs and stopping the SR prohibiting timers corresponding to the SRs.

And if the UL grant carries the BSR MAC CE of the SL interface for direct communication according to the priority sequence of the BSR MAC CEs, only canceling the pending sidelink SR and stopping the SR prohibiting timer corresponding to the sidelink SR.

Step 25: the terminal sends the MAC PDU in the uplink grant.

In the method of transmitting a buffer status reporting according to the embodiment of the present disclosure, when a first buffer status reporting BSR and a second BSR are triggered to report, a target BSR with a higher priority is determined from the first BSR and the second BSR according to a target logical channel, and the target BSR is sent. In the embodiment of the present disclosure, a target BSR with a higher priority between the first BSR and the second BSR is dynamically determined according to a target logical channel, and the target BSR with the higher priority is sent, instead of always preferentially sending the BSR MAC CE of the Uu interface according to a fixed priority order, so that the service quality of a corresponding communication interface service, for example, the service quality of a direct communication interface service, can be effectively ensured.

Figure 3:
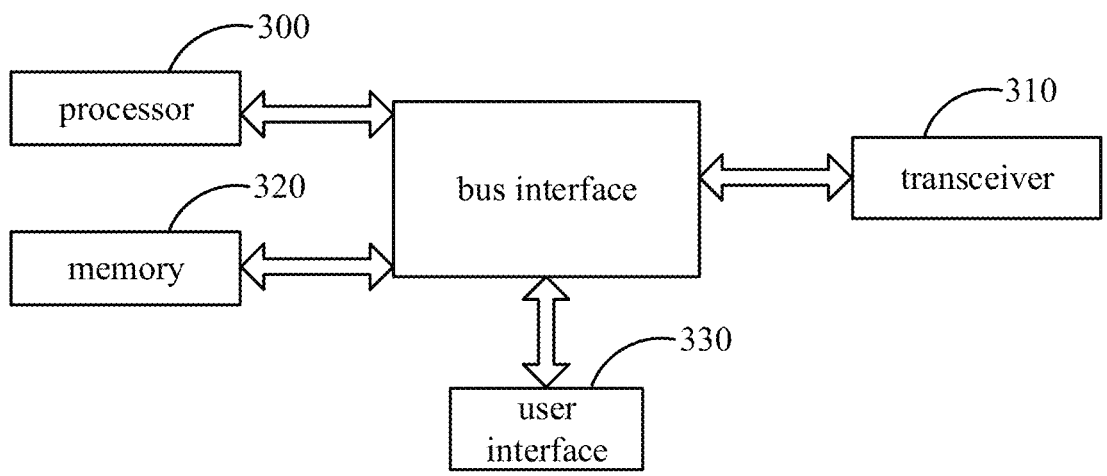
FIG. 3 is a block diagram of a terminal according to an embodiment of the present disclosure.

As shown in FIG. 3, an embodiment of the present disclosure further provides a terminal, and because a principle of solving a problem of the terminal is similar to a transmission method of a buffer status reporting in the embodiment of the present disclosure, the implementation of the terminal may refer to implementation of the method, and repeated parts are not described again. The terminal includes: a transceiver, a memory, a processor and a computer program stored in the memory and executable on the processor, the processor implementing the following steps when executing the computer program:

when triggering a reporting of the first Buffer Status Reporting (BSR) and the report of the second BSR, determining a target BSR with higher priority between the first BSR and the second BSR according to a target logic channel;

transmitting, by a transceiver, the target BSR;

the target logical channel includes a logical channel related to the first BSR and/or the second BSR, the first BSR is a BSR of a first communication interface, and the second BSR is a BSR of a second communication interface.

In FIG. 3 the bus architecture may include any number of interconnected buses and bridges, with one or more processors, represented by processor 300, and various circuits, represented by memory 320, being linked together. The bus architecture may also link together various other circuits such as peripherals, voltage regulators, power management circuits, and the like, which are well known in the art, and therefore, will not be described any further herein. The bus interface provides an interface. The transceiver 310 may be a plurality of elements, including a transmitter and a transceiver, providing a means for communicating with various other apparatus over a transmission medium. For different user devices, the user interface 330 may also be an interface capable of interfacing externally to a desired device, including but not limited to a keypad, display, speaker, microphone, joystick, etc.

The processor 300 is responsible for managing the bus architecture and general processing, and the memory 320 may store data used by the processor 300 in performing operations.

Optionally, the target logical channel includes a first logical channel that triggers the reporting of the first BSR and a second logical channel that triggers the reporting of the second BSR, or includes a third logical channel set corresponding to a scheduling request (SR) that triggers allocation of an uplink grant, where the uplink grant is an uplink grant allocated by a network device and used for carrying the first BSR and/or the second BSR.

Optionally, the step of the processor 300 executing a procedure for determining, according to a target logical channel, a target BSR with a higher priority from the first BSR and the second BSR includes:

determining a target BSR with higher priority between the first BSR and the second BSR according to the priority of the first logical channel and the priority of the second logical channel.

Optionally, the step of the processor 300 executing a procedure for determining a target BSR with higher priority from the first BSR and the second BSR according to the priority of the first logical channel and the priority of the second logical channel includes:

determining the first BSR as the target BSR when the priority of the first logical channel is higher than that of the second logical channel;

or, when the priority of the first logical channel is lower than the priority of the second logical channel, determining that the second BSR is the target BSR;

or, when the priority of the first logical channel is the same as the priority of the second logical channel, randomly selecting one BSR among the first BSR and the second BSR as the target BSR.

Optionally, before the processor 300 executes a procedure of determining, according to the priority of the first logical channel and the priority of the second logical channel, a target BSR with a higher priority from the first BSR and the second BSR, the following steps are further executed:

- the priority parameter of the first logical channel is mapped into the priority parameter of the second logical channel according to the mapping relation between the priority parameter of the first logical channel and the priority parameter of the second logical channel, the priorities of the first logical channel and the second logical channel are compared and determined;
- or, after mapping the priority parameter of the second logical channel into the priority parameter of the first logical channel according to the priority parameter of the first logical channel and the priority parameter of the second logical channel comparing and determining the priorities of the first logical channel and the second logical channel;
- or determining the priority of the first logical channel and the priority of the second logical channel according to the relation between the value corresponding to the priority parameter of the first logical channel and a first preset threshold;
- or determining the priority of the first logical channel and the priority of the second logical channel according to the relation between the value corresponding to the priority parameter of the second logical channel and a second preset threshold;
- or determining the priority of the first logical channel and the priority of the second logical channel according to the priority parameter of the first logical channel and the priority parameter of the second logical channel.

Optionally, the step of executing, by the processor 300, a program for determining the priorities of the first logical channel and the second logical channel according to a relationship between a value corresponding to the priority parameter of the first logical channel and a first preset threshold includes:

- when the value corresponding to the priority parameter of the first logic channel is smaller than a first preset threshold value, determining that the priority of the first logic channel is higher than the priority of the second logic channel.

Optionally, the step of executing, by the processor 300, a program for determining the priorities of the first logical channel and the second logical channel according to a relationship between a value corresponding to the priority parameter of the second logical channel and a second preset threshold includes:

- when the value corresponding to the priority parameter of the second logic channel is smaller than a second preset threshold value, determining that the priority of the second logic channel is higher than the priority of the first logic channel.

Optionally, the step of the processor 300 executing a procedure for determining, according to a target logical channel, a target BSR with a higher priority from the first BSR and the second BSR includes:

- determining the first BSR as a target BSR when only a logical channel of a first communication interface is included in the third logical channel set;
- or, in a case that the third logical channel set only includes a logical channel of a second communication interface, determining that the second BSR is a target BSR;
- or, in a case that the third logical channel set includes a logical channel of the first communication interface and a logical channel of the second communication interface, determining a target BSR with a higher priority from the first BSR and the second BSR according to a priority of a fourth logical channel and a priority of a fifth logical channel;
- the fourth logical channel is a logical channel with the highest priority among logical channels corresponding to the first communication interface in the third logical channel set, and the fifth logical channel is a logical channel with the highest priority among logical channels corresponding to the second communication interface in the third logical channel set.

Optionally, the processor 300 performs a procedure of determining, according to the priority of the fourth logical channel and the priority of the fifth logical channel, a target BSR with a higher priority from the first BSR and the second BSR, including:

- determining the first BSR as a target BSR when the priority of the fourth logical channel is higher than that of the fifth logical channel;
- or, when the priority of the fifth logical channel is higher than that of the fifth logical channel, determining that the second BSR is a target BSR;
- or, in a case that the priority of the fourth logical channel is the same as the priority of the fifth logical channel, randomly selecting one BSR among the first BSR and the second BSR as the target BSR.

Optionally, before the processor 300 performs a procedure of determining a target BSR with a higher priority from the first BSR and the second BSR according to the priority of the fourth logical channel and the priority of the fifth logical channel, the following steps are further performed:

- according to the mapping relation between the priority parameter of the fourth logical channel and the priority parameter of the fifth logical channel, after the priority parameter of the fourth logical channel is mapped into the priority parameter of the fifth logical channel, the priorities of the fourth logical channel and the fifth logical channel are compared and determined;
- or, according to the priority parameter of the fourth logical channel and the priority parameter of the fifth logical channel, after mapping the priority parameter of the fifth logical channel into the priority parameter of the fourth logical channel, comparing and determining the priorities of the fourth logical channel and the fifth logical channel;
- or determining the priority of the fourth logical channel and the priority of the fifth logical channel according to the relationship between the value corresponding to the priority parameter of the fourth logical channel and a third preset threshold;
- or determining the priority of the fourth logical channel and the priority of the fifth logical channel according to the relationship between the value corresponding to the priority parameter of the fifth logical channel and a fourth preset threshold;
- or determining the priority of the fourth logical channel and the priority of the fifth logical channel according to the priority parameter of the fourth logical channel and the priority parameter of the fifth logical channel.

Optionally, after determining, according to a target logical channel, a target BSR with a higher priority from the first BSR and the second BSR, the processor 300 further performs the following steps:

- when uplink grant allocated by network equipment can only carry a BSR of one communication interface, if the target BSR is the second BSR, canceling all suspended SRs and stopping an SR prohibition timer corresponding to the SR;

or, in the case that the uplink grant can only carry a BSR of one communication interface, if the target BSR is the first BSR, only the SR triggered by the first communication interface is cancelled, and the SR prohibition timer corresponding to the SR triggered by the first communication interface is stopped.

Optionally, the first communication interface is a communication interface between a terminal and the terminal, and the second communication interface is a communication interface between the terminal and a network device.

When executed by the processor 300, the program can implement all implementation manners in the above-mentioned embodiment of the transmission method of buffer status reporting, and can achieve the same technical effect, and is not described herein again to avoid repetition.

In some embodiments of the present disclosure, a computer-readable storage medium, storing a computer program is further provided in an embodiment of the present disclosure, where the computer program is executed by a processor to perform:

when triggering a first Buffer Status Reporting (BSR) and a second BSR, determining a target BSR with a higher priority between the first BSR and the second BSR according to a target logic channel;

sending the target BSR;

the target logical channel includes a logical channel related to the first BSR and/or the second BSR, the first BSR is a BSR of a first communication interface, and the second BSR is a BSR of a second communication interface.

When executed by the processor, the program can implement all implementation manners in the above-mentioned transmission method embodiment of the buffer status reporting, and can achieve the same technical effect, and is not described herein again to avoid repetition.

Figure 4:
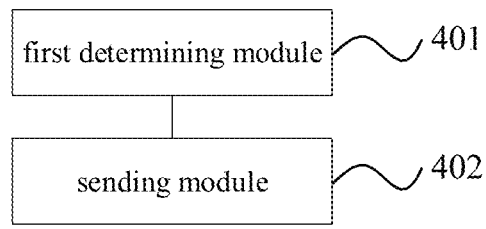
FIG. 4 is a block diagram of a terminal according to an embodiment of the disclosure.

As shown in FIG. 4, an embodiment of the present disclosure further provides a terminal, and a principle of solving a problem of the terminal is similar to a transmission method of a buffer status reporting in the embodiment of the present disclosure, so the implementation of the terminal may refer to the implementation of the method, and repeated parts are not described again.

The terminal includes: a first determining module 401, configured to determine, according to a target logical channel, a target BSR with a higher priority from a first BSR and a second BSR, when a first BSR and a second BSR are triggered to report;

a sending module 402, configured to send the target BSR;

the target logical channel includes a logical channel related to the first BSR and/or the second BSR, the first BSR is a BSR of a first communication interface, and the second BSR is a BSR of a second communication interface.

In the terminal of the embodiment of the present disclosure, the target logical channel includes a first logical channel that triggers the reporting of the first BSR and a second logical channel that triggers the reporting of the second BSR, or includes a third logical channel set corresponding to a scheduling request (SR) that triggers allocation of an uplink grant, where the uplink grant is an uplink grant allocated by a network device and used for carrying the first BSR and/or the second BSR.

In the terminal according to the embodiment of the present disclosure, the first determining module is configured to determine, according to the priority of the first logical channel and the priority of the second logical channel, a target BSR with a higher priority from the first BSR and the second BSR.

In the terminal of the embodiment of the present disclosure, the first determining module is configured to determine that the first BSR is the target BSR when the priority of the first logical channel is higher than the priority of the second logical channel;

or, when the priority of the first logical channel is lower than the priority of the second logical channel, determining that the second BSR is the target BSR;

or, when the priority of the first logical channel is the same as the priority of the second logical channel, randomly selecting one BSR among the first BSR and the second BSR as the target BSR.

The terminal of the embodiment of the present disclosure further includes:

a second determining module, configured to:

after a priority parameter of the first logical channel is mapped into a priority parameter of the second logical channel according to a mapping relation between the priority parameter of the first logical channel and the priority parameter of the second logical channel, compare and determine the priority of the first logical channel and the priority of the second logical channel; or after a priority parameter of the second logical channel is mapped into a priority parameter of the first logical channel according to the priority parameter of the first logical channel and the priority parameter of the second logical channel, compare and determine the priority of the first logical channel and the priority of the second logical channel; or determine the priority of the first logical channel and the priority of the second logical channel, according to a relation between a value corresponding to a priority parameter of the first logical channel and a first preset threshold; or determine the priority of the first logical channel and the priority of the second logical channel, according to a relation between a value corresponding to a priority parameter of the second logical channel and a second preset threshold; or determine the priority of the first logical channel and the priority of the second logical channel according to a priority parameter of the first logical channel and a priority parameter of the second logical channel.

In the terminal of the embodiment of the present disclosure, the second determining module is configured to determine that the priority of the first logical channel is higher than the priority of the second logical channel when the value corresponding to the priority parameter of the first logical channel is smaller than a first preset threshold.

In the terminal of the embodiment of the present disclosure, the second determining module is configured to determine that the priority of the second logical channel is higher than the priority of the first logical channel when the value corresponding to the priority parameter of the second logical channel is smaller than a second preset threshold.

In the terminal according to the embodiment of the present disclosure, the first determining module is configured to determine that the first BSR is a target BSR when the third logical channel set only includes a logical channel of a first communication interface;

or, in a case that the third logical channel set only includes a logical channel of a second communication interface, determining that the second BSR is a target BSR;

or, in a case that the third logical channel set includes a logical channel of the first communication interface and a logical channel of the second communication interface, determining a target BSR with a higher priority from the first BSR and the second BSR according to a priority of a fourth logical channel and a priority of a fifth logical channel;

the fourth logical channel is a logical channel with the highest priority among logical channels corresponding to the first communication interface in the third logical channel set, and the fifth logical channel is a logical channel with the highest priority among logical channels corresponding to the second communication interface in the third logical channel set.

In the terminal according to the embodiment of the present disclosure, the first determining module is configured to determine that the first BSR is a target BSR when the priority of the fourth logical channel is higher than the priority of the fifth logical channel;

or, when the priority of the fifth logical channel is higher than that of the fifth logical channel, determining that the second BSR is a target BSR;

or, in a case that the priority of the fourth logical channel is the same as the priority of the fifth logical channel, randomly selecting one BSR among the first BSR and the second BSR as the target BSR.

The terminal of the embodiment of the present disclosure further includes:

a third determining module, configured to:

after a priority parameter of the fourth logical channel is mapped into a priority parameter of the fifth logical channel according to a mapping relation between the priority parameter of the fourth logical channel and the priority parameter of the fifth logical channel, compare and determine the priority of the fourth logical channel and the priority of the fifth logical channel; or after a priority parameter of the fifth logical channel is mapped into a priority parameter of the fourth logical channel according to a mapping relation between the priority parameter of the fourth logical channel and the priority parameter of the fifth logical channel, compare and determine the priority of the fourth logical channel and the priority of the fifth logical channel; or determine the priority of the fourth logical channel and the priority of the fifth logical channel according to a relationship between a value corresponding to a priority parameter of the fourth logical channel and a third preset threshold; or determine the priority of the fourth logical channel and the priority of the fifth logical channel according to a relationship between a value corresponding to a priority parameter of the fifth logical channel and a fourth preset threshold; or determine the priority of the fourth logical channel and the priority of the fifth logical channel according to a priority parameter of the fourth logical channel and a priority parameter of the fifth logical channel.

The terminal of the embodiment of the present disclosure further includes:

a processing module, configured to:

when an uplink grant allocated by a network equipment is able to carry a BSR of only one communication interface, if the target BSR is the second BSR, cancel all suspended SRs and stop SR prohibition timers corresponding to the SRs; or when an uplink grant is able to carry a BSR of only one communication interface, if the target BSR is the first BSR, cancel only a SR triggered by the first communication interface, and stop a SR prohibition timer corresponding to the SR triggered by the first communication interface.

In the terminal according to the embodiment of the present disclosure, the first communication interface is a communication interface between the terminal and the terminal, and the second communication interface is a communication interface between the terminal and the network device.

The terminal in the embodiment of the present disclosure can implement all implementation manners in the transmission method embodiment of the buffer status reporting, and can achieve the same technical effect, and in order to avoid repetition, details are not described here again.

In various embodiments of the present disclosure, it should be understood that the sequence numbers of the above-mentioned processes do not imply an order of execution, and the order of execution of the processes should be determined by their functions and inherent logic, and should not constitute any limitation to the implementation processes of the embodiments of the present disclosure.

It is to be understood that the embodiments described in connection with the embodiments of the present disclosure may be implemented in hardware, software, firmware, middleware, microcode, or a combination thereof. For a hardware implementation, the various modules, units, sub-modules, etc. may be implemented in one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose processors, controllers, micro-controllers, microprocessors, other electronic units designed to perform the functions described in this disclosure, or a combination thereof.

For a software implementation, the techniques described in the embodiments of the present disclosure may be implemented with modules (e.g., procedures, functions, and so on) that perform the functions described in the embodiments of the present disclosure. The software codes may be stored in a memory and executed by a processor. The memory may be implemented within the processor or external to the processor.

While the foregoing is directed to some embodiments of the present disclosure, it will be appreciated by those skilled in the art that various changes and modifications may be made therein without departing from the principles of the disclosure, and it is intended that such changes and modifications be covered by the scope of the disclosure.

What is claimed is:

1. A method of transmitting a buffer status reporting, comprising:

in response to a first Buffer Status Reporting (BSR) and a second BSR being triggered, determining a target BSR with a higher priority between the first BSR and the second BSR according to a target logic channel;

sending the target BSR;

wherein the target logical channel comprises a logical channel related to the first BSR and/or the second BSR, the first BSR is a BSR of a first communication interface, and the second BSR is a BSR of a second communication interface;

wherein the target logical channel refers to a first logical channel with a highest priority and belonging to any logical channel group (LCG) contained in the first BSR, or a second logical channel with a highest priority and belonging to any LCG contained in the second BSR, or refers to a third logical channel corresponding to a scheduling request (SR) for triggering an allocation of an uplink grant, wherein the uplink grant is allocated by a network device and configured to carry the first BSR and/or the second BSR.

2. The method of transmitting the buffer status reporting according to claim 1, wherein the determining the target BSR with the higher priority between the first BSR and the second BSR according to the target logic channel comprises:
determining the target BSR with the higher priority between the first BSR and the second BSR according to a priority of the first logical channel and a priority of the second logical channel.

3. The method of transmitting the buffer status reporting according to claim 2, wherein determining the target BSR with the higher priority between the first BSR and the second BSR according to the priority of the first logical channel and the priority of the second logical channel comprises:
determining the first BSR as the target BSR when the priority of the first logical channel is higher than the priority of the second logical channel; or
determining the second BSR as the target BSR when the priority of the first logical channel is lower than the priority of the second logical channel; or
selecting randomly one of the first BSR and the second BSR as the target BSR when the priority of the first logical channel is the same as the priority of the second logical channel.

4. The method of transmitting the buffer status reporting according to claim 2, wherein prior to the determining the target BSR with the higher priority between the first BSR and the second BSR according to the priority of the first logical channel and the priority of the second logical channel, the method further comprises:
after a priority parameter of the first logical channel is mapped into a priority parameter of the second logical channel according to a mapping relation between the priority parameter of the first logical channel and the priority parameter of the second logical channel, comparing and determining the priority of the first logical channel and the priority of the second logical channel; or
after a priority parameter of the second logical channel is mapped into a priority parameter of the first logical channel according to the priority parameter of the first logical channel and the priority parameter of the second logical channel, comparing and determining the priority of the first logical channel and the priority of the second logical channel; or
determining the priority of the first logical channel, according to a relation between a priority value of the first logical channel and a first preset threshold, and determining the priority of the second logical channel, according to a relation between a priority value of the second logical channel and a second preset threshold; or
determining the priority of the first logical channel and the priority of the second logical channel according to a priority parameter of the first logical channel and a priority parameter of the second logical channel.

5. The method of transmitting the buffer status reporting according to claim 4, wherein the determining the priority of the first logical channel according to the relation between the priority value of the first logical channel and the first preset threshold comprises:
when the priority value of the first logical channel is smaller than the first preset threshold, determining that the priority of the first logic channel is higher than the priority of the second logic channel and the second preset threshold is not configured or the priority value of the second logic channel is equal to or larger than the second preset threshold;
or
the determining the priority of the second logical channel according to the relation between the priority value of the second logical channel and the second preset threshold comprises:
when the priority value of the second logical channel is smaller than the second preset threshold, determining that the priority of the second logic channel is higher than the priority of the first logic channel.

6. The method of transmitting the buffer status reporting according to claim 1, wherein the determining the target BSR with higher priority between the first BSR and the second BSR according to the target logical channel comprises:
determining the first BSR as the target BSR when only the logical channel of the first communication interface is included in the third logical channel set; or
determining the second BSR as the target BSR when only the logical channel of the second communication interface is included in the third logical channel set; or
when the third logical channel set comprises the logical channel of the first communication interface and the logical channel of the second communication interface, determining, according to a priority of a fourth logical channel and a priority of a fifth logical channel, the target BSR with the higher priority between the first BSR and the second BSR;
wherein the fourth logical channel is a logical channel with a highest priority among logical channels corresponding to the first communication interface in the third logical channel set, and the fifth logical channel is a logical channel with a highest priority among logical channels corresponding to the second communication interface in the third logical channel set.

7. The method of transmitting the buffer status reporting according to claim 6, wherein the determining the target BSR with higher priority between the first BSR and the second BSR according to the priority of the fourth logical channel and the priority of the fifth logical channel comprises:
determining the first BSR as the target BSR when the priority of the fourth logical channel is higher than the priority of the fifth logical channel; or
determining the second BSR as the target BSR when the priority of the fifth logical channel is higher than the priority of the fourth logical channel; or
selecting randomly one of the first BSR and the second BSR as the target BSR when the priority of the fourth logical channel is the same as the priority of the fifth logical channel.

8. The method of transmitting buffer status reporting according to claim 6, wherein prior to the determining the target BSR with higher priority between the first BSR and the second BSR according to the priority of the fourth logical channel and the priority of the fifth logical channel, the method further comprises:

after a priority parameter of the fourth logical channel is mapped into a priority parameter of the fifth logical channel according to a mapping relation between the priority parameter of the fourth logical channel and the priority parameter of the fifth logical channel, comparing and determining the priority of the fourth logical channel and the priority of the fifth logical channel; or after a priority parameter of the fifth logical channel is mapped into a priority parameter of the fourth logical channel according to a mapping relation between the priority parameter of the fourth logical channel and the priority parameter of the fifth logical channel, comparing and determining the priority of the fourth logical channel and the priority of the fifth logical channel; or determining the priority of the fourth logical channel and the priority of the fifth logical channel according to a relationship between a priority value of the fourth logical channel and a third preset threshold; or determining the priority of the fourth logical channel and the priority of the fifth logical channel according to a relationship between a priority value of the fifth logical channel and a fourth preset threshold; or determining the priority of the fourth logical channel and the priority of the fifth logical channel according to a priority parameter of the fourth logical channel and a priority parameter of the fifth logical channel.

9. The method of transmitting the buffer status reporting according to claim 1, wherein subsequent to the determining the target BSR with the higher priority between the first BSR and the second BSR according to the target logic channel, the method further comprises:

when an uplink grant allocated by a network equipment is able to carry a BSR of only one communication interface, if the target BSR is the second BSR, canceling all suspended SRs and stopping SR prohibition timers corresponding to the SRs; or when an uplink grant is able to carry a BSR of only one communication interface, if the target BSR is the first BSR, cancelling only a SR triggered by the first communication interface, and stopping a SR prohibition timer corresponding to the SR triggered by the first communication interface;

wherein the first communication interface is a communication interface between terminals, and the second communication interface is a communication interface between a terminal and a network device.

10. A terminal, comprising: a transceiver, a memory, a processor, and a program stored in the memory and executable on the processor, wherein the processor is configured to execute the program to perform:

in response to a first Buffer Status Reporting (BSR) and a second BSR being triggered, determining a target BSR with a higher priority between the first BSR and the second BSR according to a target logic channel;

sending the target BSR;

wherein the target logical channel comprises a logical channel related to the first BSR and/or the second BSR, the first BSR is a BSR of a first communication interface, and the second BSR is a BSR of a second communication interface;

wherein the target logical channel refers to a first logical channel with a highest priority and belonging to any logical channel group (LCG) contained in the first BSR, or a second logical channel with a highest priority and belonging to any LCG contained in the second BSR, or refers to a third logical channel corresponding to a scheduling request (SR) for triggering an allocation of an uplink grant, wherein the uplink grant is allocated by a network device and configured to carry the first BSR and/or the second BSR.

11. The terminal according to claim 10, wherein the determining the target BSR with the higher priority between the first BSR and the second BSR according to the target logic channel comprises:

determining the target BSR with the higher priority between the first BSR and the second BSR according to a priority of the first logical channel and a priority of the second logical channel.

12. The terminal according to claim 11, wherein determining the target BSR with the higher priority between the first BSR and the second BSR according to the priority of the first logical channel and the priority of the second logical channel comprises:

determining the first BSR as the target BSR when the priority of the first logical channel is higher than the priority of the second logical channel; or determining the second BSR as the target BSR when the priority of the first logical channel is lower than the priority of the second logical channel; or selecting randomly one of the first BSR and the second BSR as the target BSR when the priority of the first logical channel is the same as the priority of the second logical channel.

13. The terminal according to claim 11, wherein prior to the determining the target BSR with the higher priority between the first BSR and the second BSR according to the priority of the first logical channel and the priority of the second logical channel, the processor is configured to execute the program to perform:

after a priority parameter of the first logical channel is mapped into a priority parameter of the second logical channel according to a mapping relation between the priority parameter of the first logical channel and the priority parameter of the second logical channel, comparing and determining the priority of the first logical channel and the priority of the second logical channel; or after a priority parameter of the second logical channel is mapped into a priority parameter of the first logical channel according to the priority parameter of the first logical channel and the priority parameter of the second logical channel, comparing and determining the priority of the first logical channel and the priority of the second logical channel; or determining the priority of the first logical channel, according to a relation between a priority value of the first logical channel and a first preset threshold, and determining the priority of the second logical channel, according to a relation between a priority value of the second logical channel and a second preset threshold; or determining the priority of the first logical channel and the priority of the second logical channel according to a priority parameter of the first logical channel and a priority parameter of the second logical channel.

14. The terminal according to claim 13, wherein the determining the priority of the first logical channel according to the relation between the priority value of the first logical channel and the first preset threshold comprises:

when the priority value of the first logical channel is smaller than the first preset threshold, determining that the priority of the first logic channel is higher than the priority of the second logic channel and the second preset threshold is not configured or the priority value of the second logic channel is equal to or larger than the second preset threshold;
or
the determining the priority of the second logical channel according to the relation between the priority value of the second logical channel and the second preset threshold comprises:
when the priority value of the second logical channel is smaller than the second preset threshold, determining that the priority of the second logic channel is higher than the priority of the first logic channel.

15. The terminal according to claim 10, wherein the determining the target BSR with higher priority between the first BSR and the second BSR according to the target logical channel comprises:
determining the first BSR as the target BSR when only the logical channel of the first communication interface is included in the third logical channel set; or
determining the second BSR as the target BSR when only the logical channel of the second communication interface is included in the third logical channel set; or
when the third logical channel set comprises the logical channel of the first communication interface and the logical channel of the second communication interface, determining, according to a priority of a fourth logical channel and a priority of a fifth logical channel, the target BSR with the higher priority between the first BSR and the second BSR;
wherein the fourth logical channel is a logical channel with a highest priority among logical channels corresponding to the first communication interface in the third logical channel set, and the fifth logical channel is a logical channel with a highest priority among logical channels corresponding to the second communication interface in the third logical channel set.

16. The terminal according to claim 15, wherein the determining the target BSR with higher priority between the first BSR and the second BSR according to the priority of the fourth logical channel and the priority of the fifth logical channel comprises:
determining the first BSR as the target BSR when the priority of the fourth logical channel is higher than the priority of the fifth logical channel; or
determining the second BSR as the target BSR when the priority of the fifth logical channel is higher than the priority of the fourth logical channel; or
selecting randomly one of the first BSR and the second BSR as the target BSR when the priority of the fourth logical channel is the same as the priority of the fifth logical channel.

17. The terminal according to claim 15, wherein prior to the determining the target BSR with higher priority between the first BSR and the second BSR according to the priority of the fourth logical channel and the priority of the fifth logical channel, he processor is configured to execute the program to perform:
after a priority parameter of the fourth logical channel is mapped into a priority parameter of the fifth logical channel according to a mapping relation between the priority parameter of the fourth logical channel and the priority parameter of the fifth logical channel, comparing and determining the priority of the fourth logical channel and the priority of the fifth logical channel; or
after a priority parameter of the fifth logical channel is mapped into a priority parameter of the fourth logical channel according to a mapping relation between the priority parameter of the fourth logical channel and the priority parameter of the fifth logical channel, comparing and determining the priority of the fourth logical channel and the priority of the fifth logical channel; or
determining the priority of the fourth logical channel and the priority of the fifth logical channel according to a relationship between a priority value of the fourth logical channel and a third preset threshold; or
determining the priority of the fourth logical channel and the priority of the fifth logical channel according to a relationship between a priority value of the fifth logical channel and a fourth preset threshold; or
determining the priority of the fourth logical channel and the priority of the fifth logical channel according to a priority parameter of the fourth logical channel and a priority parameter of the fifth logical channel.

18. The terminal according to claim 10, wherein subsequent to the determining the target BSR with the higher priority between the first BSR and the second BSR according to the target logic channel, the processor is configured to execute the program to perform:
when an uplink grant allocated by a network equipment is able to carry a BSR of only one communication interface, if the target BSR is the second BSR, canceling all suspended SRs and stopping SR prohibition timers corresponding to the SRs; or
when an uplink grant is able to carry a BSR of only one communication interface, if the target BSR is the first BSR, cancelling only a SR triggered by the first communication interface, and stopping a SR prohibition timer corresponding to the SR triggered by the first communication interface;
wherein the first communication interface is a communication interface between terminals, and the second communication interface is a communication interface between a terminal and a network device.

* * * * *